United States Patent
Singh et al.

(10) Patent No.: US 11,481,195 B2
(45) Date of Patent: Oct. 25, 2022

(54) SYNTHESIZING PROGRAMS IN A SPREADSHEET PROGRAMMING LANGUAGE

(71) Applicant: Google LLC, Mountain View, CA (US)

(72) Inventors: Rishabh Singh, San Jose, CA (US); Aaron Zemach, Mountain View, CA (US); Chiraag Galaiya, Mountain View, CA (US); Dima Brezhnev, Mountain View, CA (US); David Lick, Mountain View, CA (US); Francisco Velasquez, Mountain View, CA (US); Max Lin, Mountain View, CA (US); Neha Bhargava, Mountain View, CA (US); Peilun Zhang, Mountain View, CA (US); Rahul Srinivasan, Mountain View, CA (US); Simon Tong, Mountain View, CA (US); Victoria Taylor, Mountain View, CA (US); Vishnu Sivaji, Mountain View, CA (US); Zifan Xiao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 30 days.

(21) Appl. No.: 17/122,290

(22) Filed: Dec. 15, 2020

(65) Prior Publication Data
US 2021/0382697 A1    Dec. 9, 2021

Related U.S. Application Data

(60) Provisional application No. 63/036,898, filed on Jun. 9, 2020.

(51) Int. Cl.
G06F 8/30    (2018.01)
G06F 40/18   (2020.01)
G06F 16/2457 (2019.01)

(52) U.S. Cl.
CPC .......... *G06F 8/31* (2013.01); *G06F 16/24578* (2019.01); *G06F 40/18* (2020.01)

(58) Field of Classification Search
None
See application file for complete search history.

(56) References Cited

U.S. PATENT DOCUMENTS 6,430,584 B1    8/2002  Comer et al.
6,766,512 B1 *  7/2004  Khosrowshahi ........ G06F 40/18
                                                    715/234

(Continued)

OTHER PUBLICATIONS

Gulwani et al., "Spreadsheet Data Manipulation Using Examples," ACM, 2012, 9pg. (Year: 2012).*

(Continued)

*Primary Examiner* — Ryan D. Coyer
(74) *Attorney, Agent, or Firm* — Middleton Reutlinger (57) ABSTRACT

Techniques are described herein for automatically synthesizing programs that include one or more functions in a spreadsheet programming language. A method includes: receiving a first example including input provided in a first cell in a spreadsheet; automatically synthesizing a plurality of candidate programs including a first set of candidate programs consistent with the first example, wherein each candidate program in the first set of candidate programs comprises at least one function in a spreadsheet programming language and, when the candidate program is executed, the candidate program generates output that matches the first example; ranking the plurality of candidate programs; and storing a highest-ranked program of the plurality of candidate programs in association with the first cell in the spreadsheet.

20 Claims, 5 Drawing Sheets

(56) References Cited

U.S. PATENT DOCUMENTS

| | | | |
|---|---|---|---|
| 8,799,234 B2 | 8/2014 | Gulwani et al. | |
| 8,972,930 B2 | 3/2015 | Gulwani | |
| 10,409,892 B2 | 9/2019 | Rothschiller et al. | |
| 10,635,414 B2 * | 4/2020 | Gulwani | G06F 8/40 |
| 10,831,451 B2 * | 11/2020 | Udupa | G06F 8/31 |
| 11,036,478 B2 * | 6/2021 | Lu | G06F 11/3692 |
| 2003/0226105 A1 * | 12/2003 | Waldau | H04L 67/02 |
| | | | 707/E17.121 |
| 2009/0328010 A1 * | 12/2009 | Cao | G06F 40/18 |
| | | | 717/139 |
| 2010/0269092 A1 * | 10/2010 | Dorman | G06F 9/45512 |
| | | | 715/219 |
| 2012/0011084 A1 | 1/2012 | Gulwani et al. | |
| 2014/0282375 A1 | 9/2014 | Gulwani et al. | |
| 2015/0019216 A1 | 1/2015 | Singh et al. | |
| 2018/0075115 A1 | 3/2018 | Murray et al. | |
| 2018/0113848 A1 | 4/2018 | Gulwani et al. | |
| 2018/0113906 A1 | 4/2018 | Gulwani et al. | |
| 2018/0232351 A1 * | 8/2018 | Singh | G06F 16/25 |
| 2019/0042210 A1 | 2/2019 | Gaunt et al. | |
| 2019/0121847 A1 * | 4/2019 | Castañeda-Villagran | |
| | | | G06F 40/186 |

OTHER PUBLICATIONS

Gulwani et al., "NLyze: Interactive Programming by Natural Language for Spreadsheet Data Analysis and Manipulation," ACM, 2014, 12pg. (Year: 2014).*

Gulwani, S. et al., "Spreadsheet Data Manipulation Using Examples;" Communications of the ACM, vol. 55, No. 8; pp. 97-105; Aug. 1, 2012.

European Patent Office; International Search Report and Written Opinion of PCT/US2021/036647; 14 pages; dated Sep. 21, 2021.

* cited by examiner

SYNTHESIZING PROGRAMS IN A SPREADSHEET PROGRAMMING LANGUAGE

BACKGROUND

Spreadsheet applications may implement a spreadsheet programming language that includes various functions that operate on data in a cell or range of cells in a spreadsheet and/or on other inputs in order to produce various outputs. Non-limiting examples of functions in a spreadsheet programming language include sum, count, average, length, concatenate, maximum, minimum, and lookup functions.

Users may manually enter data into a spreadsheet that could be obtained programmatically. For example, a user may manually enter last names into a column in a first table that could be obtained instead by using a function in a spreadsheet programming language to extract the last names from a column in a second table that stores full names. This manual approach, however, may be an inefficient use of user time and computer storage resources, as it may result in excessive data entry, client device usage, and duplication of the same data in multiple places in a spreadsheet. Additionally, when the underlying data changes in one location (e.g., a user's last name changes), the change must be manually propagated to all places in the spreadsheet where the data is used.

Users who are not programmers or experienced spreadsheet application users may be unaware of or uncomfortable with using functions in the spreadsheet programming language that are usable to programmatically obtain data to populate certain cells in a spreadsheet. Additionally, users may not understand how to combine together multiple functions in the spreadsheet programming language to form a program to obtain data to populate certain cells in a spreadsheet. Other users may be able to write their own programs that use multiple functions in the spreadsheet programming language to obtain data, but the programs that they write may be inefficient solutions that require excess processing and memory resources compared to more efficient solutions for obtaining the same data. Moreover, manually crafting the programs can often take an extended amount of time (e.g., to identify appropriate function(s), for trial and error, etc.) and, as a result, can lead to excess usage of power resources and/or other computational resource(s) of a client device used in manually crafting the programs. This can be exacerbated when the client device has a relatively small display and/or a software keyboard, both of which can prolong the amount of time needed to craft the programs.

SUMMARY

Implementations disclosed herein relate to automatically synthesizing programs that include at least one function in a spreadsheet programming language and that, when executed, generate output matching one or more user-provided output examples. For example, a user input in a first cell in a spreadsheet can be used as a first example, and multiple candidate programs in an underlying spreadsheet programming language including a first set of candidate programs can be automatically synthesized such that each program in the first set of candidate programs, when executed, generates output that matches the first example. The candidate programs can then be ranked based on one or more criteria, and a highest-ranked program can be selected and stored in association with the first cell, e.g., as a replacement for the user input.

In some implementations, a user input in a second cell in the spreadsheet can be used as a second example, and the multiple candidate programs that are automatically synthesized may include a second set of candidate programs that, when executed, generate output that matches the second example. Prior to ranking the candidate programs based on predetermined criteria, candidate programs that are not included in both the first set of candidate programs and the second set of candidate programs can be removed from the candidate programs. In this way, any automatically synthesized programs that do not produce output consistent with both of the user-provided examples are eliminated from the candidate programs. In other implementations, user input in additional cells in the spreadsheet can be used as additional examples, and automatically synthesized programs that do not produce output consistent with the additional examples can also be eliminated from the candidate programs.

In some implementations, additional cells in the spreadsheet that are related to the first cell can be identified, and the highest-ranked program can be stored in association with each of the additional cells. For example, additional cells in a column in a particular table in a spreadsheet can be identified as being related to a first cell in the column in the particular table, and the highest-ranked program can be stored in association with each of the additional cells in the column.

In some implementations, the automatically synthesized programs can use, as input, data from one or more other cells present in one or more tables in the spreadsheet (e.g., data source cells). In other implementations, the automatically synthesized programs can use, as input, data from external data sources such as enterprise knowledge bases. The external data sources can be included in an external data source mapping associated with the spreadsheet that includes references (e.g., uniform resource locators or other links) to the external data sources.

In some implementations, a data type of the first example can be determined, and execution of programs having output data types that do not match the data type of the first example is avoided. Accordingly, system resources can be conserved by avoiding calling of programs that cannot generate output matching user-provided examples.

In some implementations, the data type of the first example can be determined to be a numeric data type, and execution of programs having output data types that do not match the numeric data type can be avoided. In other implementations, the data type of the first example can be determined to be a date data type, and execution of programs having output data types that do not match the date data type can be avoided.

In some implementations, program input data can be obtained from a data source cell in the spreadsheet or from an external data source, and a data type of the program input data can be determined. Execution of programs having input data types that do not match the data type of the program input data can be avoided. Accordingly, system resources can be conserved by avoiding calling of programs that cannot utilize the type of data included in the program input data as input.

In some implementations, a range of acceptable output values can be determined, and execution of programs having output data values falling outside of the range of acceptable output data values can be avoided. Accordingly, system resources can be conserved by avoiding calling of programs that cannot generate output falling within an acceptable range of values.

In some implementations, candidate programs having more frequently used functions can be ranked higher than candidate programs having less frequently used functions. For example, a score can be assigned to each function in the candidate program based on a frequency of use of the function from historical spreadsheet data (e.g., frequency of use when manually written), and an overall score for the candidate program can be determined based on the scores assigned to each of the functions in the candidate program. The candidate programs can then be ranked based on the overall scores. Accordingly, candidate programs that include more frequently used function(s) may be ranked higher and, as a result, be more likely to be selected, utilized, and presented to users. The more frequently used function(s) of the candidate programs can be easier to comprehend by users, which can result in more computationally efficient review and/or editing of those programs.

In some implementations, candidate programs that are shorter, e.g., use a smaller total number of functions, can be ranked ahead of candidate programs that use a larger total number of functions. In other implementations, candidate programs that are simpler, e.g., use a smaller number of levels of nested functions, can be ranked ahead of candidate programs that use a larger number of levels of nested functions. Accordingly, system resources can be conserved by avoiding using overly complex programs.

In some implementations, a corpus of spreadsheets can be obtained (e.g., a collection of spreadsheets created by users with a particular company or organization), and the corpus of spreadsheets can be analyzed to obtain a plurality of program idioms, each including a plurality of functions in the spreadsheet programming language. Additional candidate programs can be automatically synthesized and included in the first set of candidate programs consistent with the first example, where each of the additional candidate programs includes one or more of the program idioms and, when executed, generates output that matches the first example. In other implementations, the additional candidate programs can include functions in the spreadsheet programming language, in addition to the program idioms. Additionally, in other implementations, in addition to or instead of analyzing the corpus of spreadsheets, online resources can be analyzed to obtain a plurality of program idioms.

In some additional or alternative implementations, a first example including user input provided in a first cell in a spreadsheet and a second example including user input provided in a second cell in the spreadsheet can be received. A first set of programs consistent with the first example and a second set of programs consistent with the second example can be automatically synthesized. Each program in the first set of programs, when executed, generates output that matches the first example and each program in the second set of programs, when executed, generates output that matches the second example. Candidate programs can then be generated by determining an intersection of the first set of programs and the second set of programs. The candidate programs can then be ranked, a highest-ranked program of the plurality of candidate programs can be determined, and the user input provided in the first cell in the spreadsheet and the user input provided in the second cell in the spreadsheet can be replaced with the highest-ranked program.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
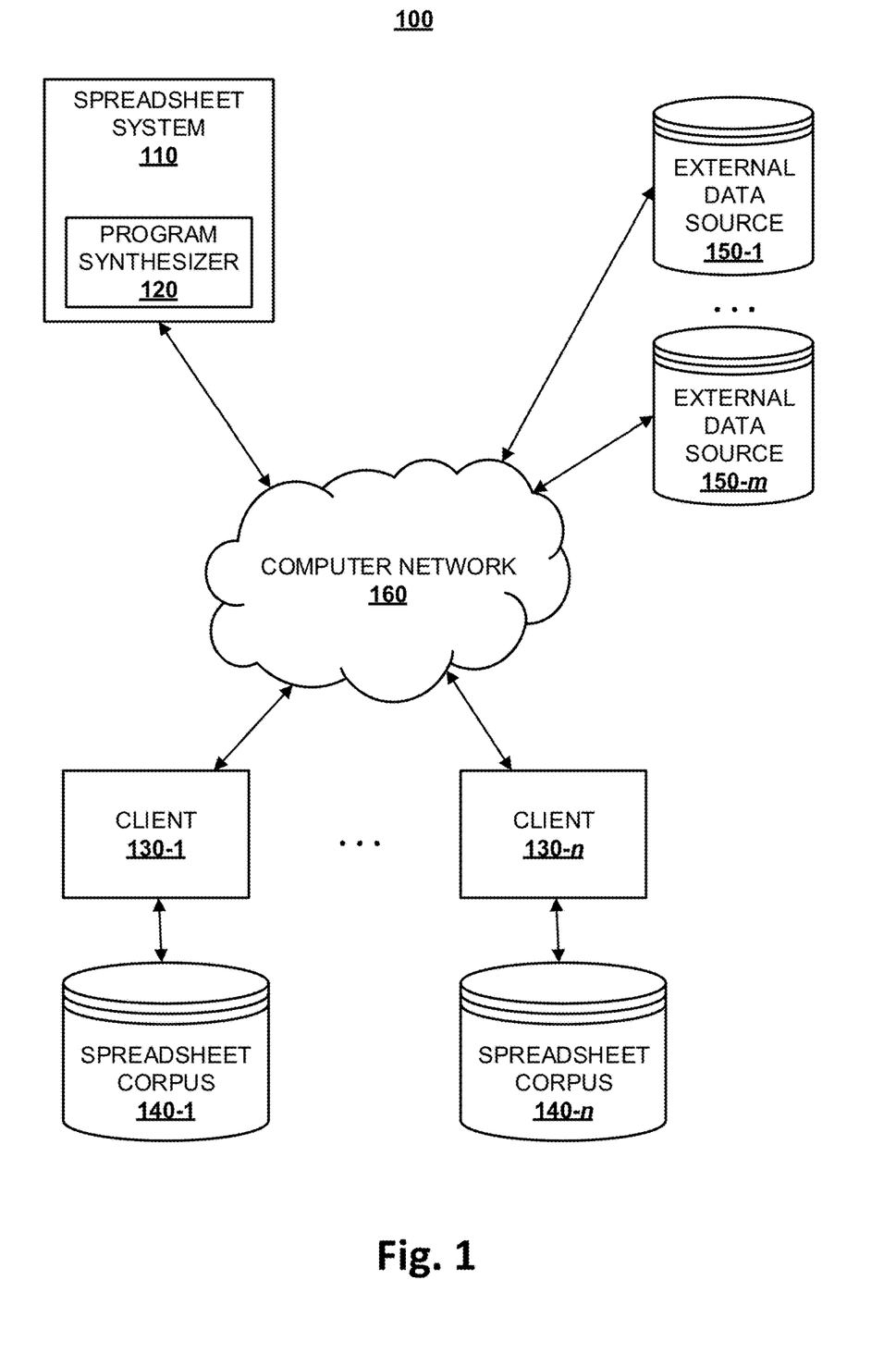
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a spreadsheet system 110, may be implemented using one or more server computing devices that form what is sometimes referred to as a "cloud infrastructure," although this is not required.

In implementations, the environment 100 may include a spreadsheet system 110 that implements a spreadsheet application that is accessible from various clients, including clients 130-1, . . . , 130-n that may be included in the environment 100, through either a thin client interface, such as a web browser (e.g., a web-based spreadsheet application), or a program interface. In implementations, the spreadsheet application that is implemented by the spreadsheet system 110 may be a software as a service (SaaS) spreadsheet application. The spreadsheet system 110 and the clients 130-1, . . . , 130-n may be in communication via a computer network 160, which may be any suitable network including any combination of a local area network (LAN), wide area network (WAN), or the Internet. The spreadsheet system 110 may include, among other things, a program synthesizer 120 that is configured to perform selected aspects of the present disclosure in order to automatically synthesize programs that include one or more functions in a spreadsheet programming language for use in spreadsheets that are created, modified, and/or viewed using one or more of the clients 130-1, . . . , 130-n.

Each of the clients 130-1, . . . , 130-n may be, for example, a user computing device that is used by a user to access a spreadsheet application via spreadsheet application user interface, such as a SaaS spreadsheet application, that is provided by the spreadsheet system 110, e.g., through a web browser. In an example, the clients 130-1, . . . , 130-n may be user computing devices associated with an individual or an entity or organization such as a business (e.g., financial institute, bank, etc.), non-profit, club, university, government agency, or any other organization that uses a spreadsheet application. For example, a business may operate a spreadsheet application to create, modify, and/or view one or more spreadsheets to manage financial records, business records, client lists, and so forth.

In various implementations, the environment 100 may include spreadsheet corpuses 140-1, . . . , 140-$n$ that are accessible to the clients 130-1, . . . , 130-$n$ via the computer network 160 or another network. Each of the spreadsheet corpuses 140-1, . . . , 140-$n$ may include multiple spreadsheets created by one or more of the clients 130-1, . . . , 130-$n$, e.g., using the spreadsheet system 110. In an example, the spreadsheet corpuses 140-1, . . . , 140-$n$ may include a set of spreadsheets created, edited, or viewed by users of one or more of the clients 130-1, . . . , 130-$n$ associated with a particular entity or organization.

The program synthesizer 120 may be configured to utilize, as examples, data input into one or more cells in a spreadsheet in order to aid the clients 130-1, . . . , 130-$n$ in automatically synthesizing programs that include one or more functions in a spreadsheet programming language for use in the spreadsheet. For example, the program synthesizer 120 may be configured to enable automatic synthesis of programs that include one or more functions in a spreadsheet programming language, without requiring any human intervention, and to optionally present the output of the automatically synthesized programs to users of the clients 130-1, . . . , 130-$n$ via the spreadsheet application user interface as well as optionally present the automatically synthesized programs themselves to users of the clients 130-1, . . . , 130-$n$ for review and/or editing via the spreadsheet application user interface.

In various implementations, the environment 100 may include external data sources 150-1, . . . , 150-$m$ that store data that may be accessible to the clients 130-1, . . . , 130-$n$ and/or the program synthesizer 120 of the spreadsheet system 110 via the computer network 160 or another network. In implementations, data in the external data sources 150-1, . . . , 150-$m$ may be used as inputs to programs that are automatically synthesized by the program synthesizer 120.

Figure 2:
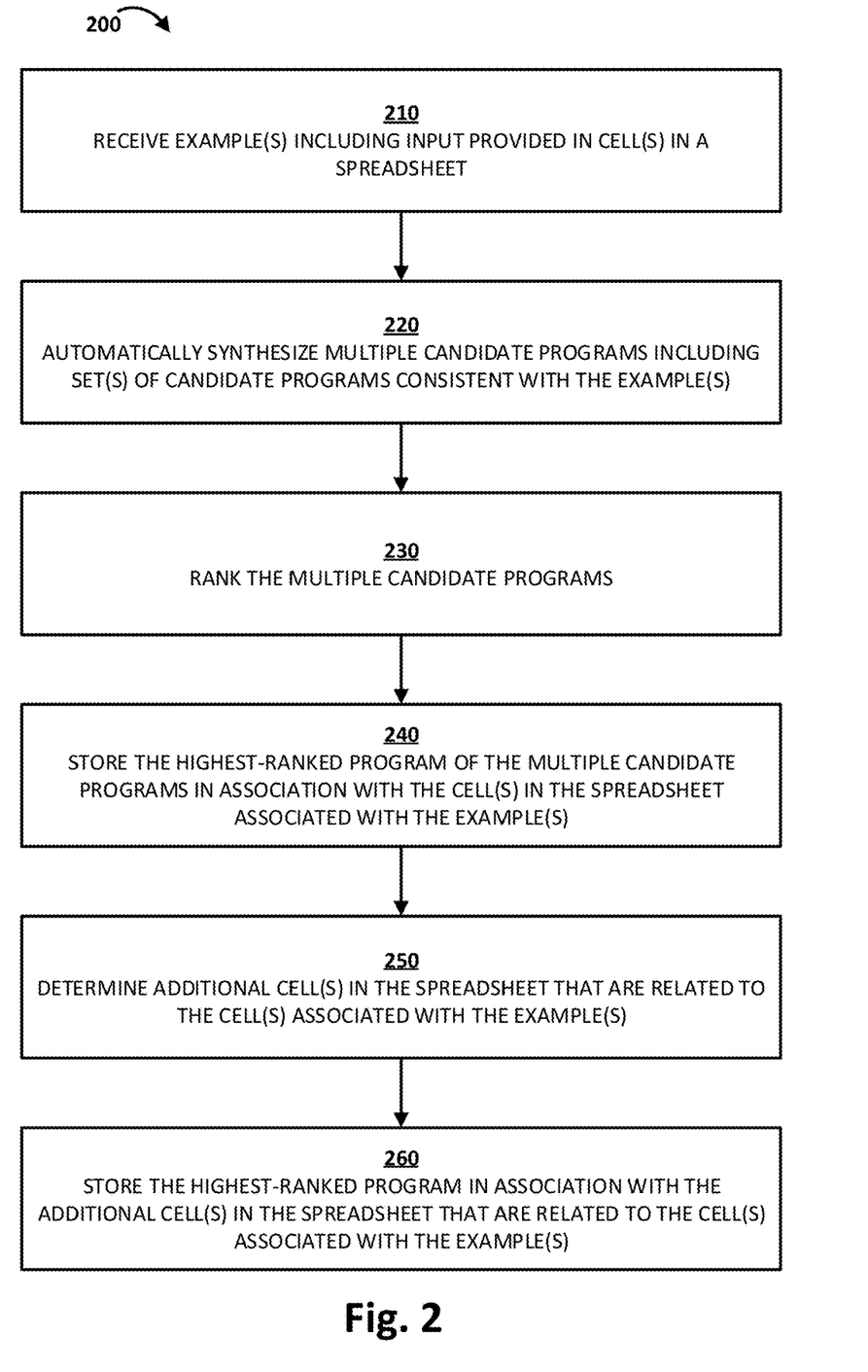
FIG. 2 depicts a flowchart illustrating an example method for practicing selected aspects of the present disclosure.

FIG. 2 is a flowchart illustrating an example method 200 of automatically synthesizing programs that include one or more functions in a spreadsheet programming language, in accordance with implementations disclosed herein. For convenience, the operations of the flowchart are described with reference to a system that performs the operations. This system may include various components of various computer systems, such as one or more components of the spreadsheet system 110. Moreover, while operations of method 200 are shown in a particular order, this is not meant to be limiting. One or more operations may be reordered, omitted, or added.

At block 210, the system may receive example(s) including input provided in cell(s) in a spreadsheet. In implementations, at block 210, the program synthesizer 120 of the spreadsheet system 110 may receive a first example including input provided in a first cell in a spreadsheet. In an example, the program synthesizer 120 of the spreadsheet system 110 may receive a last name (e.g., "LastNameOne") as the first example in response to a user providing the last name as the input in the first cell (e.g., B2) in the spreadsheet via a spreadsheet application user interface displayed on one of the clients 130-1, . . . , 130-$n$.

Still referring to block 210, the program synthesizer 120 of the spreadsheet system 110 may optionally receive one or more additional examples, such as a second example including input provided in a second cell in the spreadsheet. In implementations, the program synthesizer 120 may receive any number of examples. In an example, the program synthesizer 120 of the spreadsheet system 110 may receive another last name (e.g., "LNTwo") as the second example in response to the user providing the last name as the input in the second cell (e.g., B3) in the spreadsheet via the spreadsheet application user interface displayed on one of the clients 130-1, . . . , 130-$n$.

Still referring to FIG. 2, at block 220, the system may automatically synthesize multiple candidate programs including set(s) of candidate programs consistent with the example(s). In implementations, at block 220, the program synthesizer 120 of the spreadsheet system 110 may use dynamic programming-based search algorithms to automatically synthesize a first set of candidate programs consistent with the first example received at block 210. In implementations, each candidate program in the first set of candidate programs may include at least one function in a spreadsheet programming language and, when the candidate program is executed, the candidate program generates output that matches the first example.

Still referring to block 220, in implementations, each candidate program may when executed use, as program input data, data stored in one or more data source cells in the spreadsheet and/or data from one or more of the external data sources 150-1, . . . , 150-$m$. For example, while automatically synthesizing the candidate programs, the program synthesizer 120 may obtain program input data from one or more of the external data sources 150-1, . . . , 150-$m$ and then use the program input data as input to one or more of the candidate programs (e.g., as input to one or more functions in a spreadsheet programming language used in the candidate programs). In implementations, the external data sources may include enterprise knowledge bases, databases, other spreadsheets, and/or any other data sources. In implementations, the external data sources 150-1, . . . , 150-$m$ may be included in an external data source mapping that is associated with the spreadsheet and that includes references (e.g., paths, uniform resource locators, links, etc.) to the external data sources 150-1, . . . , 150-$m$. In implementations, the program synthesizer 120 may use sampling-based search techniques to handle very large tables and knowledge bases.

In implementations, for a given user, the external data sources 150-1, . . . , 150-$m$ that are used by the program synthesizer 120 can include (or be restricted to) enterprise knowledge bases that are linked with an account of the user. In an example, for a first user, the program synthesizer 120 can use all enterprise knowledge bases of an organization, but for a second user, the program synthesizer 120 can use only a subset of the enterprise knowledge bases of the organization, based on the links with the accounts of the users. In implementations, the links with the accounts of the users may be included in the external data source mapping and/or may be based on user permissions/rights to the databases.

In implementations, the program synthesizer 120 can first search personal and/or enterprise databases that are included in the external data sources 150-1, . . . , 150-$m$ to identify or locate program input data, and only search other general databases that are included in the external data sources 150-1, . . . , 150-$m$ if the program input data is not identified (located) in the personal and/or enterprise databases.

Continuing with the previous example, the program synthesizer 120 of the spreadsheet system 110 may automatically synthesize a first set of candidate programs that generate output that matches the last name received as the first example ("LastNameOne") at block 210. One or more of the candidate programs may use, as program input data, data stored in another cell in the spreadsheet, e.g., data stored in a cell (e.g., cell A2) that is in a column (e.g., column A) that stores full names, in the same row as the first cell corresponding to the first example. In the example, the program input data, "FirstNameOne LastNameOne", may be stored in cell A2.

A first candidate program included in the first set of candidate programs may be a program that uses a "LEN" function in a spreadsheet programming language that returns a length of a string, a "FIND" function in the spreadsheet programming language that returns a position at which a string is first found within text, and a "RIGHT" function in the spreadsheet programming language that returns a substring from the end of a specified string. For example, the program RIGHT(A2, LEN(A2)-FIND(" ", A2)) may be included in the first set of candidate programs that is synthesized at block 210. When the first candidate program is executed, using "FirstNameOne LastNameOne" as the program input data, "LastNameOne" is returned as the output, and therefore the first candidate program generates output that matches the first example.

A second candidate program included in the first set of candidate programs may be a program that uses the "RIGHT" function in the spreadsheet programming language. For example, the program RIGHT(A2, 11) may be included in the first set of candidate programs that is synthesized at block 210. When the second candidate program is executed, using "FirstNameOne LastNameOne" as the program input data, "LastNameOne" is returned as the output, and therefore the second candidate program generates output that matches the first example.

Still referring to block 220, in implementations, in response to one or more additional examples being received by the program synthesizer 120 of the spreadsheet system 110 at block 210, the program synthesizer 120 may use dynamic programming-based search algorithms to automatically synthesize additional sets of candidate programs consistent with each of the additional examples. In implementations, the program synthesizer 120 may synthesize a number of sets of candidate programs that matches the number of examples received at block 210. For example, in the case that a second example is received by the program synthesizer 120 at block 210, the program synthesizer 120 may use dynamic programming-based search algorithms to automatically synthesize a second set of candidate programs consistent with the second example received at block 210. Additionally, in the case that a third example is received by the program synthesizer 120 at block 210, the program synthesizer 120 may use dynamic programming-based search algorithms to automatically synthesize a third set of candidate programs consistent with the third example received at block 210, and so forth.

Continuing with the previous example, the program synthesizer 120 of the spreadsheet system 110 may automatically synthesize a second set of candidate programs that generate output that matches the last name received as the second example ("LNTwo") at block 210. One or more of the candidate programs may use, as program input data, data stored in another cell in the spreadsheet, e.g., data stored in a cell (e.g., cell A3) that is in a column (e.g., column A) that stores full names, in the same row as the second cell corresponding to the second example. In the example, the program input data, "FNTwo LNTwo", may be stored in cell A3.

A first candidate program included in the second set of candidate programs may be a program that uses a "LEN" function in a spreadsheet programming language that returns a length of a string, a "FIND" function in the spreadsheet programming language that returns a position at which a string is first found within text, and a "RIGHT" function in the spreadsheet programming language that returns a substring from the end of a specified string. For example, the program RIGHT(A3, LEN(A3)-FIND(" ", A3)) may be included in the second set of candidate programs that is synthesized at block 210. When the first candidate program is executed, using "FNTwo LNTwo" as the program input data, "LNTwo" is returned as the output, and therefore the first candidate program included in the second set of candidate programs generates output that matches the second example.

A second candidate program included in the second set of candidate programs may be a program that uses the "RIGHT" function in the spreadsheet programming language. For example, the program RIGHT(A3, 5) may be included in the second set of candidate programs that is synthesized at block 210. When the second candidate program is executed, using "FNTwo LNTwo" as the program input data, "LNTwo" is returned as the output, and therefore the second candidate program included in the second set of candidate programs generates output that matches the second example.

Still referring to block 220, in implementations, the program synthesizer 120 of the spreadsheet system 110 may synthesize candidate programs with incrementally larger numbers of functions as the number of examples received at block 210 is increased. In an example, with only one example received at block 210, the program synthesizer 120 may only use the LEFT, RIGHT, and MID functions in synthesizing the candidate programs, but with two examples received at block 210, the program synthesizer 120 may use IF and case transformation functions in synthesizing the candidate programs.

Still referring to block 220, in implementations, the program synthesizer 120 of the spreadsheet system 110, in the automatically synthesizing multiple candidate programs including the set(s) of candidate programs consistent with the example(s), may determine a data type of the examples and avoid execution of programs having output data types that do not match the data types of the examples. In an example, the program synthesizer 120 may determine a data type of the first example to be a numeric data type, and the program synthesizer 120 may avoid execution of programs having output data types that do not match the numeric data type. In another example, the program synthesizer 120 may determine a data type of the first example to be a date data type, and the program synthesizer 120 may avoid execution of programs having output data types that do not match the date data type.

Still referring to block 220, in implementations, the program synthesizer 120 of the spreadsheet system 110, in the automatically synthesizing multiple candidate programs including the set(s) of candidate programs consistent with the example(s), may obtain program input data from a data source cell in the spreadsheet or from one of the external data sources 150-1, . . . , 150-m, determine a data type of the program input data, and avoid execution of programs having input data types that do not match the data type of the program input data.

Still referring to block 220, in implementations, the program synthesizer 120 of the spreadsheet system 110, in the automatically synthesizing multiple candidate programs including the set(s) of candidate programs consistent with the example(s), may determine a range of acceptable output data values (e.g., 1 to 31 for a day of the month), and avoid execution of programs having output data values falling outside of the range of acceptable data output values.

Still referring to block 220, in implementations, the program synthesizer 120 of the spreadsheet system 110 may obtain one or more of the spreadsheet corpuses 140-1, . . . , 140-*n* and analyze one or more of the spreadsheet corpuses 140-1, . . . , 140-*n* to obtain a plurality of program idioms (e.g., predefined programs), each including a plurality of functions in the spreadsheet programming language. In other implementations, the program synthesizer 120 of the spreadsheet system 110 may analyze one or more online resources (e.g., websites, tutorials, one or more of the external data sources 150-1, . . . , 150-*m*, etc.) to obtain a plurality of program idioms. In implementations, in the automatically synthesizing multiple candidate programs including the set(s) of candidate programs consistent with the example(s), the program synthesizer 120 may automatically synthesize additional candidate programs that include at least one program idiom in each of the sets of candidate programs and that optionally include one or more additional functions in the spreadsheet programming language. In an example, the program synthesizer 120 may automatically synthesize additional candidate programs in the first set of candidate programs consistent with the first example, where each of the additional candidate programs, when executed, generates output that matches the first example.

Still referring to block 220, in implementations, in response to one or more additional examples being received by the program synthesizer 120 of the spreadsheet system 110 at block 210, and after synthesizing sets of candidate programs consistent with each of the examples received at block 210, the program synthesizer 120 may remove candidate programs that are not included in all of the sets of candidate programs. For example, if the program synthesizer 120 receives two examples at block 210, then the program synthesizer 120 may remove candidate programs that are not included in both a first set of candidate programs consistent with a first example and a second set of candidate programs consistent with a second example. Likewise, if the program synthesizer 120 receives three examples at block 210, then the program synthesizer 120 may remove candidate programs that are not included in each of a first set of candidate programs consistent with a first example, a second set of candidate programs consistent with a second example, and third second set of candidate programs consistent with a third example.

Still referring to block 220, in implementations, for purposes of determining whether or not a particular candidate program is included in all of the sets of candidate programs, the program synthesizer 120 may determine that candidate programs that differ only with respect to cells used for program input data are the same candidate program. For example, the program synthesizer 120 may determine that the candidate program RIGHT(A2, LEN(A2)-FIND(" ", A2)) included in the first set of candidate programs is the same as the candidate program RIGHT(A3, LEN(A3)-FIND(" ", A3)) included in the second set of candidate programs.

Still referring to block 220, in other implementations, the program synthesizer 120 may genericize the program inputs used in the candidate programs prior to determining whether or not a particular candidate program is included in all of the sets of candidate programs. For example, the program synthesizer 120 may genericize the candidate program RIGHT(A2, LEN(A2)-FIND(" ", A2)) to RIGHT(A[current row], LEN(A[current row])-FIND(" ", A[current row])) and may genericize the candidate program RIGHT(A3, LEN(A3)-FIND(" ", A3)) to RIGHT(A[current row], LEN(A[current row])-FIND(" ", A[current row])), where [current row] is a placeholder for the current row in the spreadsheet.

Continuing with the previous example, the program synthesizer 120 of the spreadsheet system 110 may determine that the candidate program RIGHT(A[current row], LEN(A[current row])-FIND(" ", A[current row])) is the only candidate program that is present in both the first set of candidate programs and the second set of candidate programs and then remove all other candidate programs from the sets of candidate programs generated at block 220. In other implementations, the program synthesizer 120 may determine that the candidate programs RIGHT(A[current row], 11) and RIGHT(A[current row], 5) are not present in both the first set of candidate programs and the second set of candidate programs and then remove those candidate programs from the sets of candidate programs generated at block 220.

Still referring to FIG. 2, at block 230, the system may rank the multiple candidate programs. In implementations, at block 230, the program synthesizer 120 of the spreadsheet system 110 may rank the multiple candidate programs that are automatically synthesized at block 220. In implementations, the program synthesizer 120 may rank candidate programs having functions that are more frequently used higher than candidate programs having functions that are less frequently used (e.g., based on historical spreadsheet data).

Still referring to block 230, in an example, for each of the candidate programs generated at block 220 that remain after any candidate programs not present in all sets are removed from the sets of candidate programs generated at block 220, the program synthesizer 120 may assign a score to each of the function(s) in the candidate program. In the example, comparatively higher scores may be assigned to functions in the candidate program that are more frequently used in one or more of the spreadsheet corpuses 140-1, . . . , 140-*n*, and comparatively lower scores may be assigned to functions in the candidate program that are less frequently used in one or more of the spreadsheet corpuses 140-1, . . . , 140-*n*. The program synthesizer 120 may then, for each of the candidate programs, determine an overall score for the candidate program based on the scores assigned to each of the function(s) in the candidate program. For example, the program synthesizer 120 may determine the overall score by averaging the scores assigned to each of the function(s) in the candidate program. Alternatively, the program synthesizer 120 determine the overall score based on a lowest score of the scores assigned to each of the function(s) in the candidate program. The program synthesizer 120 may then rank the plurality of candidate programs based on the overall scores.

Still referring to block 230, in other implementations, the program synthesizer 120 may rank candidate programs that use a smaller total number of functions ahead of candidate programs that use a larger total number of functions. In other implementations, the program synthesizer 120 may rank candidate programs that use a smaller number of levels of nested functions ahead of candidate programs that use a larger number of levels of nested functions. In other implementations, the program synthesizer 120 may rank candidate programs that use functions previously used by a particular user or organization ahead of candidate programs that use functions not previously used by a particular user or organization. In other implementations, the program synthesizer 120 may rank candidate programs based on a character class-based tokenization mechanism that decomposes input and output strings. In other implementations, the program synthesizer 120 may rank candidate programs that produce tokenized outputs higher than candidate programs that do not produce tokenized outputs.

Still referring to block 230, in other implementations, the program synthesizer 120 may rank candidate programs based on sources of program input data. For example, the program synthesizer 120 may rank candidate programs that obtain program input data from spreadsheets or knowledge bases within an organization higher than candidate programs that obtain program input data from general knowledge bases. In another example, the program synthesizer 120 may rank candidate programs that obtain program input data from more frequently accessed sources higher than candidate programs that obtain program input data from less frequently accessed sources. In other implementations, the program synthesizer 120 may use any other criteria or combination of criteria to rank the candidate programs that are generated at block 220.

Still referring to FIG. 2, at block 240, the system may store the highest-ranked program of the multiple candidate programs in association with the cell(s) in the spreadsheet associated with the example(s). In implementations, at block 240, the program synthesizer 120 of the spreadsheet system 110 may store the candidate program that is ranked highest among the multiple candidate programs at block 230 in association with the first cell in the spreadsheet (i.e., the cell associated with the first example received at block 210). In implementations, at block 240, a prompt may be displayed on the user interface displayed on the client 130-1, . . . , 130-*n* regarding the automatically synthesized program (e.g., regarding the highest-ranked program determined at block 230), and the storing the highest-ranked program at block 240 may be performed in response to a user indicating an acceptance of the automatically synthesized program, e.g., by selecting a button in the prompt or by inputting a keyboard shortcut.

Still referring to block 240, in implementations, the program synthesizer 120 may cause the input provided (e.g., by a user) in the first cell (i.e., the first example) to be replaced with the highest-ranked program. In implementations, while the program synthesizer 120 may replace the input provided in the first cell with the highest-ranked program, the value displayed in the first cell (e.g., on the user interface displayed on the client 130-1, . . . , 130-*n*) may remain unchanged, as the output of the highest-ranked program matches the input previously provided (e.g., by a user) in the cell.

Continuing with the previous example, the program synthesizer 120 may determine that the program RIGHT(A[current row], LEN(A[current row])-FIND(" ", A[current row])) is the highest-ranked program at block 230, and the program synthesizer 120 may store the program RIGHT(A[current row], LEN(A[current row])-FIND(" ", A[current row])) in association with the first cell in the spreadsheet (i.e., B2, which is the cell associated with the first example received at block 210), replacing the input provided in the first cell ("LastNameOne"). While the input "LastNameOne" provided in the first cell (i.e., B2) is replaced with the highest-ranked program, RIGHT(A[current row], LEN(A[current row])-FIND(" ", A[current row])), in the example, this program may output "LastNameOne", and therefore the value displayed in the first cell may remain unchanged.

Still referring to block 240, in implementations, in response to one or more additional examples being received by the program synthesizer 120 of the spreadsheet system 110 at block 210, the program synthesizer 120 of the spreadsheet system 110 may store the candidate program that is ranked highest among the multiple candidate programs at block 230 in association with the cells in the spreadsheet associated with the additional examples. For example, in the case that a second example is received by the program synthesizer 120 at block 210, the program synthesizer 120 may store the candidate program that is ranked highest among the multiple candidate programs at block 230 in association with the second cell in the spreadsheet (i.e., the cell associated with the second example received at block 210).

Still referring to block 240, in implementations, the program synthesizer 120 may cause the input provided (e.g., by a user) in the cells in the spreadsheet associated with the additional examples (e.g., the second example, etc.) to be replaced with the highest-ranked program. In implementations, while the program synthesizer 120 may replace the input provided in the cells in the spreadsheet associated with the additional examples with the highest-ranked program, the value displayed in the cells associated with the additional examples (e.g., on the user interface displayed on the client 130-1, . . . , 130-*n*) may remain unchanged, as the output of the highest-ranked program matches the input previously provided (e.g., by a user) in the cells.

Still referring to FIG. 2, at block 250, the system may determine additional cell(s) in the spreadsheet that are related to the cell(s) associated with the example(s). In implementations, at block 250, the program synthesizer 120 of the spreadsheet system 110 may determine one or more additional cells in the spreadsheet that are related to the cell(s) associated with the example(s) received at block 210.

Still referring to block 250, in implementations, the program synthesizer 120 may determine the one or more additional cells based on the cells being included in the same column of a particular table in the spreadsheet as the cells associated with the examples. In other implementations, the program synthesizer 120 may determine the one or more additional cells based on the cells being included in the same row of a particular table in the spreadsheet as the cells associated with the examples. In other implementations, the program synthesizer 120 may use any other criteria (e.g., headings or labels for columns or rows in the spreadsheet, existing data, etc.) to determine the one or more additional cells that are related to the cells associated with the examples.

Still referring to FIG. 2, at block 260, the system may store the highest-ranked program in association with the additional cell(s) in the spreadsheet that are related to the cell(s) associated with the example(s). In implementations, at block 260, the program synthesizer 120 of the spreadsheet system 110 may store the candidate program that is ranked highest among the multiple candidate programs at block 230 in association with each of the additional cell(s) determined at block 250.

Figure 3:
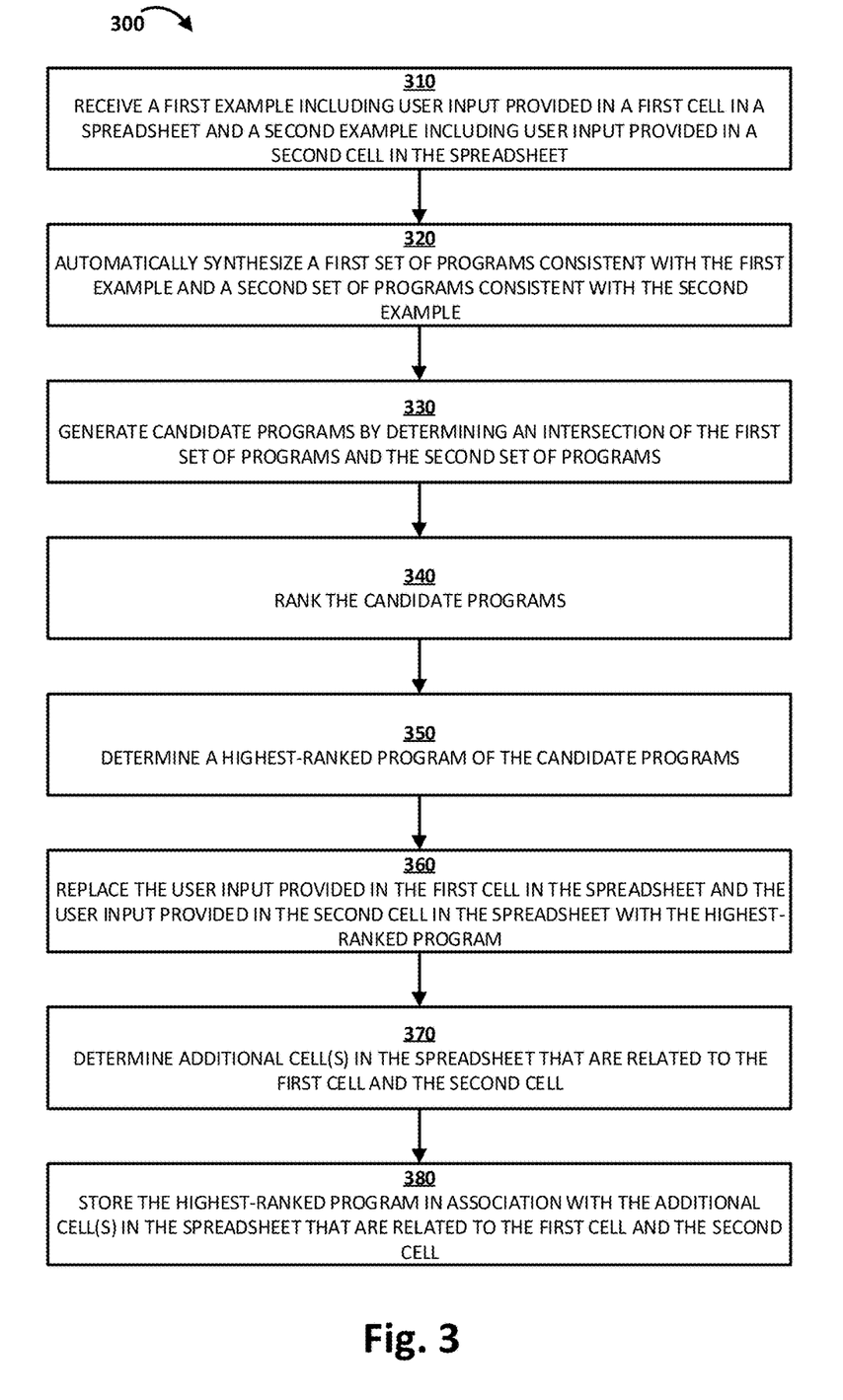
FIG. 3 depicts another flowchart illustrating an example method for practicing selected aspects of the present disclosure.

FIG. 3 is a flowchart illustrating an example method 300 of automatically synthesizing programs that include one or more functions in a spreadsheet programming language, in accordance with implementations disclosed herein. For convenience, the operations of the flowchart are described with reference to a system that performs the operations. This system may include various components of various computer systems, such as one or more components of the spreadsheet system 110. Moreover, while operations of method 300 are shown in a particular order, this is not meant to be limiting. One or more operations may be reordered, omitted, or added.

At block 310, the system may receive a first example including user input provided in a first cell in a spreadsheet and a second example including user input provided in a second cell in the spreadsheet. In implementations, at block 310, the program synthesizer 120 of the spreadsheet system 110 may receive a first example including using input provided in a first cell in a spreadsheet and a second example including user input provided in a second cell in the spreadsheet.

Still referring to FIG. 3, at block 320, the system may automatically synthesize a first set of programs consistent with the first example and a second set of programs consistent with the second example. In implementations, at block 320, the program synthesizer 120 of the spreadsheet system 110 may use dynamic programming-based search algorithms to automatically synthesize a first set of programs consistent with the first example received at block 310 and automatically synthesize a second set of programs consistent with the second example received at block 310. In implementations, each program in the first set of programs automatically synthesized by the program synthesizer 120 generates output that matches the first example received at block 310 when the program is executed, and each program in the second set of programs automatically synthesized by the program synthesizer 120 generates output that matches the second example received at block 310 when the program is executed. In implementations, the programs in the first set of programs and the programs in the second set of programs may use, as program input data, data stored in one or more cells in the spreadsheet and/or data from one or more of the external data sources 150-1, . . . , 150-m.

Still referring to FIG. 3, at block 330, the system may generate candidate programs by determining an intersection of the first set of programs and the second set of programs. In implementations, at block 330, the program synthesizer 120 of the spreadsheet system 110 may generate candidate programs by determining an intersection of the first set of programs and the second set of programs automatically synthesized at block 320. In implementations, the program synthesizer 120 may genericize (e.g., as described with respect to block 220) the program inputs used in the programs (e.g., in the first set of programs and in the second set of programs) prior to determining the intersection of the first set of programs and the second set of programs. In implementations, the program synthesizer 120 may then determine, as the intersection, the programs that exist in both the first set of programs and the second set of programs.

Still referring to FIG. 3, at block 340, the system may rank the candidate programs. In implementations, at block 340, the program synthesizer 120 of the spreadsheet system 110 may rank the candidate programs that are generated at block 330. In implementations, the program synthesizer 120 may rank the candidate programs based on any of the criteria described with respect to block 230 or based on any other criteria or combination of criteria.

Still referring to FIG. 3, at block 350, the system may determine a highest-ranked program of the candidate programs. In implementations, at block 350, the program synthesizer 120 of the spreadsheet system 110 may determine a highest-ranked program of the candidate programs that are ranked at block 340.

Still referring to FIG. 3, at block 360, the system may replace the user input provided in the first cell in the spreadsheet and the user input provided in the second cell in the spreadsheet with the highest-ranked program. In implementations, at block 360, the program synthesizer 120 of the spreadsheet system 110 may replace the user input provided in the first cell in the spreadsheet that is received at block 310 and the user input provided in the second cell in the spreadsheet that is received at block 310 with the highest-ranked program determined at block 350.

Still referring to block 360, in implementations, while the program synthesizer 120 may replace the user input provided in the first cell with the highest-ranked program, the value displayed in the first cell (e.g., on the user interface displayed on the client 130-1, . . . , 130-n) may remain unchanged, as the output of the highest-ranked program matches the input previously provided (e.g., by a user) in the first cell. Additionally, in implementations, while the program synthesizer 120 may replace the user input provided in the second cell with the highest-ranked program, the value displayed in the second cell (e.g., on the user interface displayed on the client 130-1, . . . , 130-n) may remain unchanged, as the output of the highest-ranked program matches the input previously provided (e.g., by a user) in the second cell.

Still referring to FIG. 3, at block 370, the system may determine additional cell(s) in the spreadsheet that are related to the first cell and the second cell. In implementations, at block 370, the program synthesizer 120 of the spreadsheet system 110 may determine additional cell(s) in the spreadsheet that are related to the first cell associated with the first example received at block 310 and the second cell associated with the second example received at block 310.

Still referring to FIG. 3, at block 380, the system may store the highest-ranked program in association with the additional cell(s) in the spreadsheet that are related to the first cell and the second cell. In implementations, at block 380, the program synthesizer 120 of the spreadsheet system 110 may store the highest-ranked program in association with the additional cell(s) in the spreadsheet that are related to the first cell and the second cell that are determined at block 370.

Figure 4:
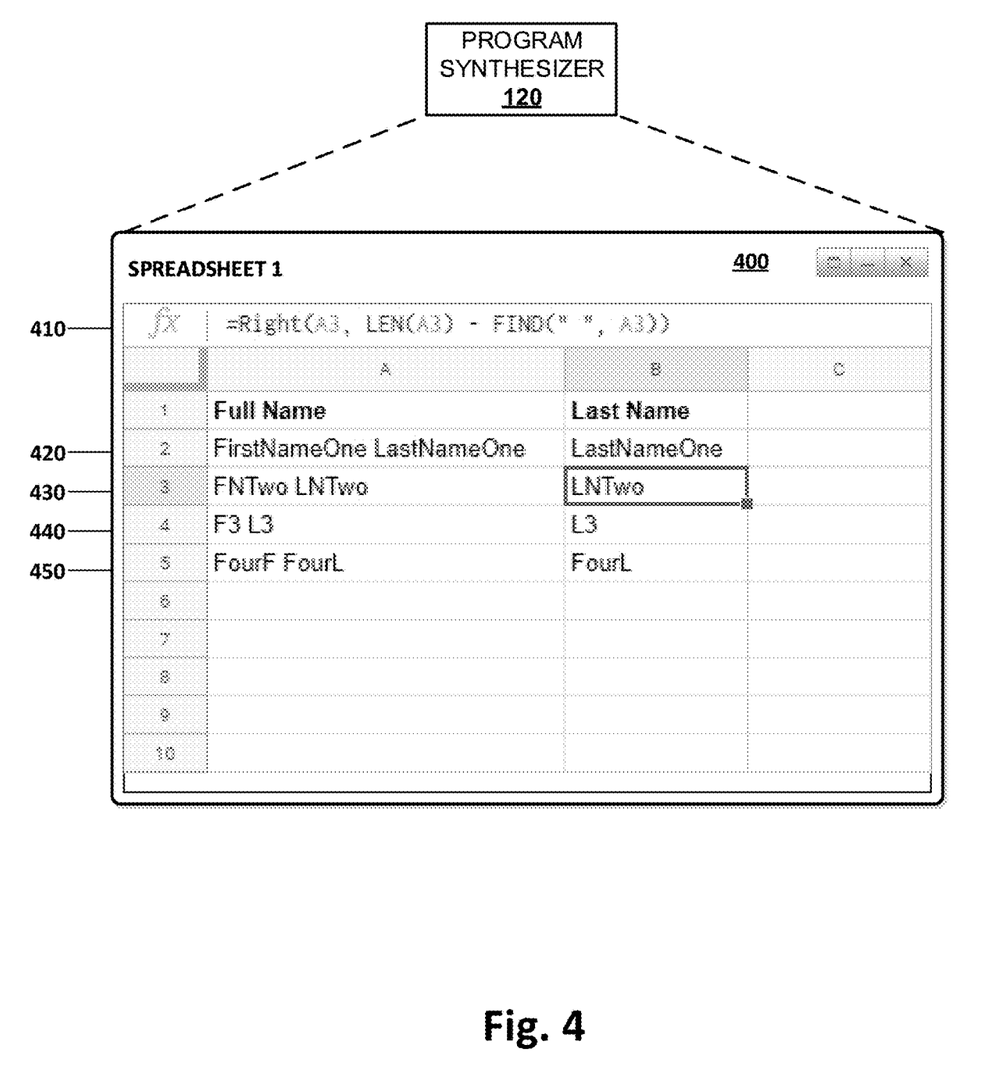
FIG. 4 depicts an example application of techniques described herein, in accordance with various implementations.

FIG. 4 depicts an example of how programs that include one or more functions in a spreadsheet programming language may be automatically synthesized. At bottom, a graphical user interface ("GUI") 400 is depicted that may be used by a spreadsheet application user to view, create, or edit a spreadsheet (e.g., "Spreadsheet 1"). In this example, Spreadsheet 1 includes a Full Name column (A) and a Last Name column (B). The Full Name column may include various full names.

In some implementations, in response to a user inputting data (e.g., a last name such as "LastNameOne") into the Last Name column (B) in the second row 420, the program synthesizer 120 of the spreadsheet system 110 may receive as a first example the input provided by the user in a first cell (B2) in the spreadsheet (e.g., as described with respect to block 210 of FIG. 2). Additionally, in some implementations, in response to the user inputting data (e.g., a last name such as "LNTwo") into the Last Name column (B) in the third row 430, the program synthesizer 120 of the spreadsheet system 110 may receive as a second example the input provided by the user in a second cell (B3) in the spreadsheet (e.g., as described with respect to block 210 of FIG. 2).

Still referring to FIG. 4, in some implementations, after automatically synthesizing multiple candidate programs (e.g., as described with respect to block 220 of FIG. 2) and ranking the multiple candidate programs (e.g., as described with respect to block 230 of FIG. 2), the program synthesizer 120 of the spreadsheet system 110 may store the highest-ranked program in association with the first cell (B2) and the second cell (B3) in the spreadsheet (e.g., as described with respect to block 240 of FIG. 2). In implementations, in response to receiving a selection of a cell such as the second cell (B3), the highest-ranked program (e.g., =Right(A3, LEN(A3)-FIND(" ", A3))) stored in association with the cell may be displayed in a formula bar 410 in the GUI 400.

Still referring to FIG. 4, in some implementations, the program synthesizer 120 of the spreadsheet system 110 may determine additional cells (i.e., B4 in the third row 440 and B5 in the fourth row 450) in the spreadsheet that are related to the cells associated with the examples (i.e., B2 and B3) (e.g., as described with respect to block 250 of FIG. 2). In some implementations, after determining the additional cells in the spreadsheet that are related to the cells associated with the examples, the program synthesizer 120 of the spreadsheet system 110 may store the highest-ranked program in association with the additional cells (i.e., B4 in the third row 440 and B5 in the fourth row 450) (e.g., as described with respect to block 260 of FIG. 2).

The scenario of FIG. 4 is for illustrative purposes only. Programs may be automatically synthesized using techniques described herein for any number of applications.

Figure 5:
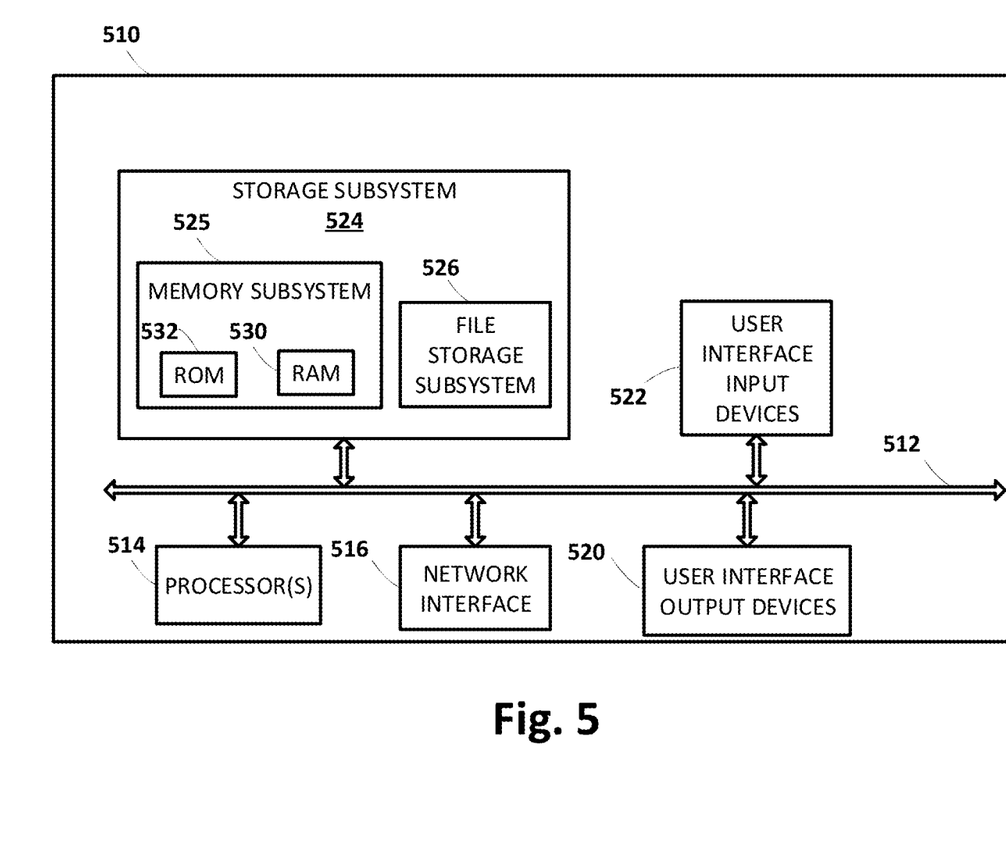
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2 and 3, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

Implementations may address problems with excessive data entry, client device usage, and duplication of the same data in multiple places in a spreadsheet by providing methods and systems for automatically synthesizing programs. In particular, some implementations may improve the functioning of a computer by providing methods and systems for automatically synthesizing programs that include at least one function in a spreadsheet programming language and that, when executed, generate output matching one or more user-provided output examples. Accordingly, through the use of rules that improve computer-related technology, implementations allow computer performance of functions not previously performable by a computer. Additionally, implementations use techniques that are, by definition, rooted in computer technology (e.g., a spreadsheet programming language, a spreadsheet user interface, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving a first example comprising input provided in a first cell in a spreadsheet;
automatically synthesizing a plurality of candidate programs comprising a first set of candidate programs consistent with the first example, wherein each candidate program in the first set of candidate programs comprises at least one function in a spreadsheet programming language that is implemented by a spreadsheet application and, when the candidate program is stored in association with the first cell and executed by the spreadsheet application, the candidate program generates output that matches the first example;
ranking the plurality of candidate programs; and
storing a highest-ranked program of the plurality of candidate programs in association with the first cell in the spreadsheet.

2. The method according to claim 1, further comprising receiving a second example comprising input provided in a second cell in the spreadsheet, and
wherein the plurality of candidate programs that is automatically synthesized further comprises a second set of candidate programs consistent with the second example, wherein each candidate program in the second set of candidate programs comprises at least one function in the spreadsheet programming language and, when the candidate program is executed, the candidate program generates output that matches the second example.

3. The method according to claim 2, further comprising:
prior to the ranking the plurality of candidate programs, removing, from the plurality of candidate programs, candidate programs that are not included in both the first set of candidate programs and the second set of candidate programs.

4. The method according to claim 1, further comprising:
determining at least one additional cell in the spreadsheet that is related to the first cell; and
storing the highest-ranked program in association with each of the at least one additional cell in the spreadsheet that is related to the first cell.

5. The method according to claim 1, further comprising obtaining program input data from at least one data source cell in the spreadsheet,
wherein at least one candidate program in the first set of candidate programs, when executed, uses, as input, the program input data obtained from the at least one data source cell in the spreadsheet.

6. The method according to claim 1, further comprising obtaining program input data from at least one external data source,
wherein at least one candidate program in the first set of candidate programs, when executed, uses, as input, the program input data obtained from the at least one external data source.

7. The method according to claim 6, wherein the at least one external data source comprises an enterprise knowledge base.

8. The method according to claim 6, wherein the at least one external data source is included in an external data source mapping that is associated with the spreadsheet and that includes references to a plurality of external data sources.

9. The method according to claim 1, wherein in the automatically synthesizing the plurality of candidate programs comprising the first set of candidate programs consistent with the first example:
a data type of the first example is determined, and
execution of programs having output data types that do not match the data type of the first example is avoided.

10. The method according to claim 9, wherein:
the data type of the first example is determined to be a numeric data type or a date data type, and
execution of programs having output data types that do not match the numeric data type or the date data type is avoided.

11. The method according to claim 1, wherein in the automatically synthesizing the plurality of candidate programs comprising the first set of candidate programs consistent with the first example:
program input data is obtained from a data source cell in the spreadsheet or from an external data source,
a data type of the program input data is determined, and
execution of programs having input data types that do not match the data type of the program input data is avoided.

12. The method according to claim 1, wherein in the automatically synthesizing the plurality of candidate programs comprising the first set of candidate programs consistent with the first example:
a range of acceptable output data values is determined, and
execution of programs having output data values falling outside of the range of acceptable output data values is avoided.

13. The method according to claim 1, wherein in the ranking the plurality of candidate programs, candidate programs having more frequently used functions are ranked higher than candidate programs having less frequently used functions.

14. The method according to claim 13, wherein the ranking the plurality of candidate programs comprises:
for each of the plurality of candidate programs:
assigning a score to each of a plurality of functions in the candidate program based on a frequency of use of the function; and
determining an overall score for the candidate program based on the scores assigned to each of the plurality of functions in the candidate program; and
ranking the plurality of candidate programs based on the overall scores.

15. The method according to claim 1, wherein in the ranking the plurality of candidate programs, candidate programs that use a smaller total number of functions are ranked ahead of candidate programs that use a larger total number of functions.

16. The method according to claim 1, wherein in the ranking the plurality of candidate programs, candidate programs that use a smaller number of levels of nested functions are ranked ahead of candidate programs that use a larger number of levels of nested functions.

17. The method according to claim 1, further comprising:
obtaining a corpus of spreadsheets;
analyzing the corpus of spreadsheets to obtain a plurality of program idioms, each comprising a plurality of functions in the spreadsheet programming language; and
automatically synthesizing additional candidate programs in the first set of candidate programs consistent with the first example,
wherein:
  each of the additional candidate programs comprises at least one of the plurality of program idioms and, when the candidate program is executed, the candidate program generates output that matches the first example; and
  one or more of the additional candidate programs further comprises at least one function in the spreadsheet programming language.

18. The method according to claim 1, further comprising:
analyzing at least one online resource to obtain a plurality of program idioms, each comprising a plurality of functions in the spreadsheet programming language; and
automatically synthesizing additional candidate programs in the first set of candidate programs consistent with the first example, wherein each of the additional candidate programs comprises at least one of the plurality of program idioms and, when the candidate program is executed, the candidate program generates output that matches the first example.

19. A computer program product comprising one or more non-transitory computer-readable storage media having program instructions collectively stored on the one or more computer-readable storage media, the program instructions executable to:
  receive a first example comprising user input provided in a first cell in a spreadsheet and a second example comprising user input provided in a second cell in the spreadsheet;
  automatically synthesize a first set of programs consistent with the first example and a second set of programs consistent with the second example, wherein:
    each program in the first set of programs and each program in the second set of programs comprises at least one function in a spreadsheet programming language that is implemented by a spreadsheet application;
    each program in the first set of programs, when stored in association with the first cell and executed by the spreadsheet application, generates output that matches the first example; and
    each program in the second set of programs, when stored in association with the second cell and executed by the spreadsheet application, generates output that matches the second example;
  generate a plurality of candidate programs by determining an intersection of the first set of programs and the second set of programs;
  rank the plurality of candidate programs;
  determine a highest-ranked program of the plurality of candidate programs; and
  replace the user input provided in the first cell in the spreadsheet and the user input provided in the second cell in the spreadsheet with the highest-ranked program.

20. A system comprising:
a processor, a computer-readable memory, one or more computer-readable storage media, and program instructions collectively stored on the one or more computer-readable storage media, the program instructions executable to:
receive a first example comprising input provided in a first cell in a spreadsheet;
automatically synthesize a plurality of candidate programs comprising a first set of candidate programs consistent with the first example, wherein each candidate program in the first set of candidate programs comprises at least one function in a spreadsheet programming language that is implemented by a spreadsheet application and, when the candidate program is stored in association with the first cell and executed by the spreadsheet application, the candidate program generates output that matches the first example;
rank the plurality of candidate programs; and
store a highest-ranked program of the plurality of candidate programs in association with the first cell in the spreadsheet.

* * * * *